United States Patent [19]
Johnson

[11] 3,846,671
[45] Nov. 5, 1974

[54] LIGHT DIMMING SYSTEM FOR CONTROLLING BRIGHTNESS AND RATE OF CHANGE OF BRIGHTNESS OF LIGHTS
[75] Inventor: James C. Johnson, Arlington, Tex.
[73] Assignee: Hunt Electronics Company, Dallas, Tex.
[22] Filed: Mar. 26, 1973
[21] Appl. No.: 344,492

[52] U.S. Cl. ............... 315/291, 315/208, 315/293, 315/299, 315/361
[51] Int. Cl. ..................... H05b 37/02, H05b 41/39
[58] Field of Search ........ 307/252 M; 315/291, 292, 315/293, 296, 299, 300, 301, 307, 316, 361, 208

[56] References Cited
UNITED STATES PATENTS
| | | | |
|---|---|---|---|
| 3,530,310 | 9/1970 | Adelson et al. | 307/252 M |
| 3,534,224 | 10/1970 | Skirpan et al. | 315/296 |
| 3,697,821 | 10/1972 | Johnson | 315/194 X |
| 3,706,913 | 12/1972 | Malatchi | 315/292 |

OTHER PUBLICATIONS
"Electronic Switching Using Silicon Controlled Rectifiers", by E. Bailey, Electronic Engineering, Feb. 1963, pg. 100.

Primary Examiner—Herman Karl Saalbach
Assistant Examiner—Eugene R. LaRoche
Attorney, Agent, or Firm—Clegg, Cantrell & Crisman

[57] ABSTRACT

One or more separate remote control units are provided for controlling the operation of a common lamp dimmer unit which, in turn, controls the lighting of a lamp or lamps. Such remote control unit is capable of controlling the brightness of the lamps and the rate at which the brightness is changed. A plurality of control units may be connected in parallel with one another to the lamp dimmer unit to individually and independently control the operation of the dimmer unit.

8 Claims, 1 Drawing Figure

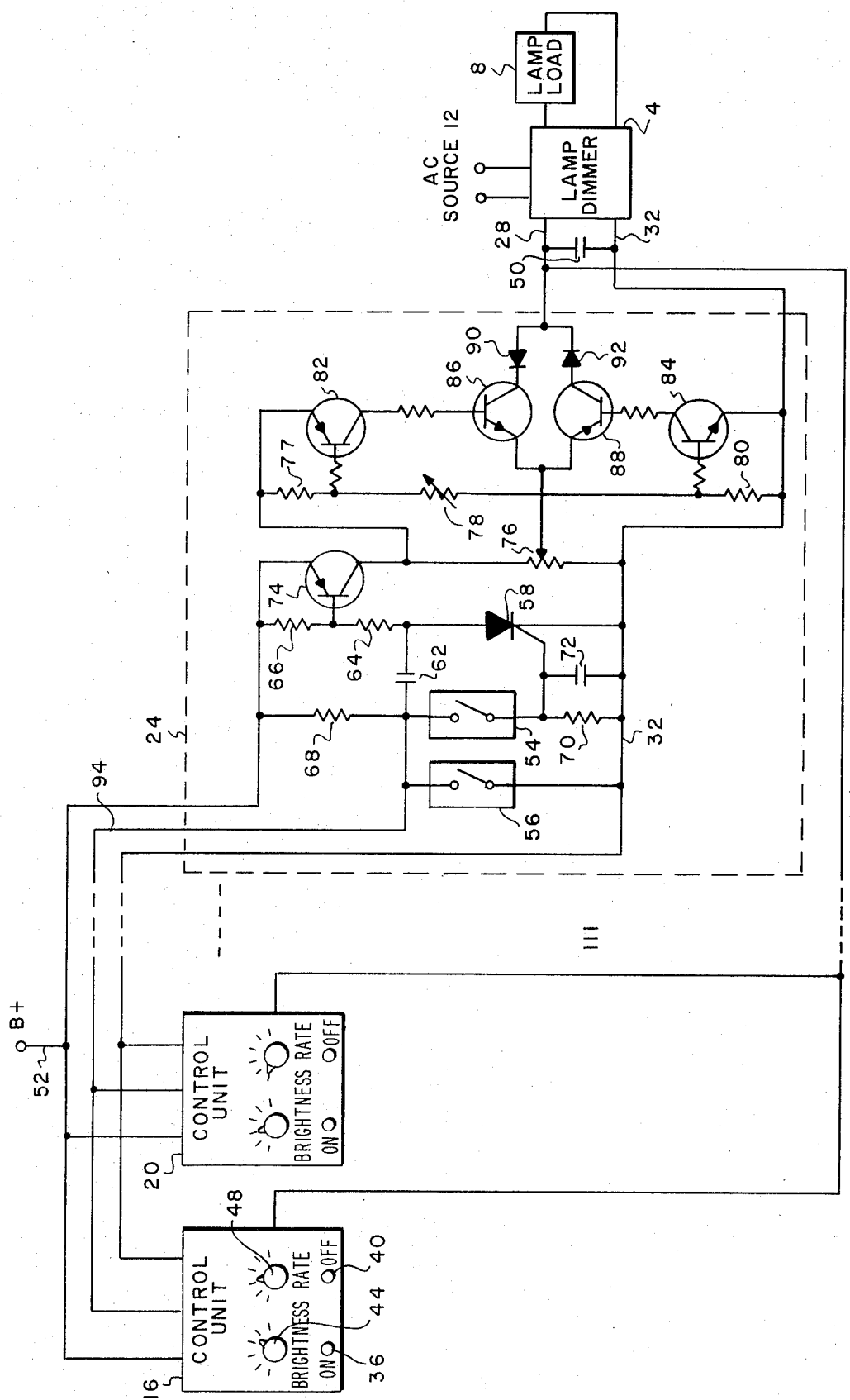

LIGHT DIMMING SYSTEM FOR CONTROLLING BRIGHTNESS AND RATE OF CHANGE OF BRIGHTNESS OF LIGHTS

BACKGROUND OF THE INVENTION

This invention relates to light dimming systems and to control units for such systems capable of controlling the brightness and the rate of change of brightness of a lamp or lamps connected to the system.

Conventional systems for controlling the rate of change of brightness of lights (i.e., the rate at which the brightness level is increased or decreased) typically include either a manually operated potentiometer or a motordriven potentiometer. With a light dimming system utilizing a manually operated potentiometer, it is difficult to obtain smooth and even transitions between brightness levels because of the dependency upon the steadiness of the human operator. Light dimming systems utilizing motor-driven potentiometers overcome this problem, but such systems are relatively bulky and costly. Further, such systems are subject to fairly rapid wear because of the frequent mechanical movement.

It is an object of the present invention to provide a compact and inexpensive light dimming system for controlling the brightness level of lights and the rate of changing the brightness level.

It is another object of the present invention to provide such a system having a relatively long and useful life.

It is still another object of the present invention to provide a control unit for a light dimming system which is adapted to control change of brightness level of light automatically and without requiring the use of a motor.

The need for light dimming systems having multiple control units has been discussed in J. C. Johnson, U.S. Pat. No. 3,697,821, issued Oct. 10, 1972. A system is there disclosed which includes a plurality of separate remote control units for individually and independently controlling the operation of a common lamp dimmer unit, each remote control unit being capable of turning off and turning on the lamp dimmer unit and of controlling the brightness of the lamps independently of the previous setting or condition of any of the other remote control units. In this system, the brightness level is controllable but not the rate of changing the brightness level (other than manually).

It is a further object of the present invention to provide a new and improved control unit for a light dimming system which may be connected in parallel with one or more other such control units to individually and independently control both the brightness and the rate of change of brightness of lights.

BRIEF DESCRIPTION OF THE DRAWINGS

The above and other objects and advantages of the present invention will become more apparent from the following detailed description presented in connection with the accompanying drawing which shows a light dimming system having a plurality of control units in accordance with the present invention.

DETAILED DESCRIPTION

The system shown in the drawing includes a master lamp dimmer unit 4 for controlling the brightness level of a lamp or lamps included in a lamp load 8. The lamp dimmer 4 controls the root-mean-square (R.M.S.) value of current flow from an A.C. source 12 to the lamp load 8. An illustrative lamp dimmer is disclosed in co-pending application, Ser. No. 168,317, filed Aug. 2, 1971 now U.S. Pat. No. 3,733,528, granted May 15, 1973.

The lamp dimmer 4 functions in response to voltage signals from a plurality of separate remote control units 16, 20, ..., and 24 which are coupled in parallel with one another to the lamp dimmer by conductors 28 and 32. Although only three control units are shown, more or less could be provided as desired by the system user. Each of the control units is identical in construction and includes two control knobs, an "on" button and an "off" button. For example, control unit 16 includes a spring-loaded pushbutton switch 36 for "turning on" the control unit 16, a spring-loaded pushbutton switch 40 for turning off the control unit 16 and also the other control units, a rotatable control knob 44 for setting the brightness or intensity level for the lamp load 8 and a rotatable control knob 48 for setting the rate at which the brightness of the lamp load 8 is to be changed from one level to another, i.e., either to a level greater or less than the previous level. Each of the control units may be used to independently control the brightness and rate of change of brightness of the lamp load 8 regardless of previous settings of any of the other control units.

A capacitor 50 interconnects conductors 28 and 32 for storing a charge and thereby supplying a voltage to the lamp dimmer 4. The lamp dimmer 4, in response to the voltage across capacitor 50, controls the brightness of the lamp load 8. The voltage across the capacitor 50 is determined by the control units 16, 20, ..., and 24 as will be more particularly described later. A direct current voltage source 51 provides a direct current operating voltage via a positive terminal 52 connected to conductor 60 and via a negative terminal 53 connected to common conductor 32, for energizing the control units 16, 20, ..., and 24. The operation of control unit 24 will now be described, it being understood that the other control units 16, 20, ..., operate in the same fashion.

The control unit 24 includes a spring-loaded normally-open switch 54 for turning on the control unit 24 and a similar spring-loaded normally open switch 56 for turning off or disabling the control unit 24 and any other control unit which may not have been turned off. The switch 54 is connected to the gate electrode of a unilateral semiconductor triode switch 58 of the type known as a silicon-controlled rectifier (SCR). The cathode of the SCR 58 is connected to the common conductor 32 interconnecting all the control units to the lamp dimmer 4. The anode of the SCR 58 is connected to the junction interconnecting a capacitor 62 and a resistor 64. When the switch 54 is momentarily closed in response to the depression of a corresponding "on" pushbutton of the control unit 24, current flows from the direct-current source 52 via a resistor 68, the switch 54 and a resistor 70 to the conductor 32. Current is also supplied to the gate electrode of the SCR 58 and this turns on or renders conductive the SCR.

When the SCR 58 is conductive, its internal anode-to-cathode impedance is very small. When turned on, the SCR 58 remains conductive until the voltage between its anode and cathode is reduced to practically zero or is reversed in polarity. With the SCR 58 conductive and the switch 54 opened following its momentary closure, the commutating capacitor 62 charges up to a direct-current voltage level corresonding to the direct-current voltage difference between the junction of resistor 68 and switch 54 (which is B+) and the junction between resistor 64 and the SCR 58 (which is near B−, i.e., near the potential of conductor 32).

Turning on the SCR 58 causes direct current to flow from the terminal 52 via a resistor 66, the resistor 64, and the SCR 58 to the conductor 32. A voltage drop is thus developed across the resistor 66 causing a PNP-type transistor 74 to be biased into saturation so that current also flows via the transistor 74 through the resistor of a potentiometer 76 to the conductor 32. The current through the resistor of the potentiometer 76 establishes a voltage at the tap of the potentiometer and it is this voltage which ultimately determines the brightness level of the lamp load 8. The tap of the potentiometer 76 is mechanically coupled to a corresponding control knob for setting the brightness level in accordance with the operation to be described hereafter.

Turning on the transistor 74 also causes current to flow from the collector of transistor through a biasing resistor 77, a variable resistor 78, and another biasing resistor 80 to the conductor 32. The adjustable element of the variable resistor 78 is mechanically coupled to a corresponding control knob for controlling the rate of changing the brightness level of the lamp load 8 as will be described hereafter.

The current flow through resistor 77 causes a voltage drop thereacross biasing a PNP-type transistor 82 into the conducting condition. The emitter-collector conductivity of the transistor 82 is determined by the current flow through the resistor 77 which, in turn, is determined by the resistance of the variable resistor 78. The current flow through the resistor 80 causes the development of a voltage drop thereacross which biases an NPN-type transistor 84 into a conducting condition, with the emitter-collector conductivity of the transistor determined by the current through the resistor 80 which, again, is determined by the current flow through the variable resistor 78. Thus, by controlling the resistance of the variable resistor 78, the conductivity of the transistors 82 and 84 can be controlled. Specifically, if the resistance of the variable resistor 78 is increased so that less current flows therethrough and thus less current flows through the resistors 77 and 80, then the transistors 82 and 84 are caused to conduct less. Conversely, if the resistance of the variable resistor 78 is decreased so that more current flows therethrough and thus through the resistors 77 and 80, transistors 82 and 84 are caused to conduct more.

The conductivity of transistors 82 and 84 controls the biasing of an NPN-type transistor 86 and a PNP-type transistor 88 respectively. That is, the greater the conductivity of transistor 82 the greater is the magnitude of the current supplied to the base of the transistor 86 and the more the transistor 86 is biased in the "on" condition. Similarly, the greater the conductivity of transistor 84, the greater is the magnitude of the negative current supplied to the base of the transistor 88 and the greater is the transistor 88 biased in the "on" condition. The degree to which the transistors 86 and 88 are biased on determines the rate of change of the brightness of the lamp load 8 from one level to another as will next be described.

As indicated earlier, the brightness level for the lamp load 8 is established by the voltage across the capacitor 50. The voltage across the capacitor 50, in turn, is determined by the setting of the tap of the potentiometer 76 and the control unit 24 being turned on (or by the setting of the tap of a corresponding potentiometer in another control unit and that control unit being turned on). Turning on the control unit 24 will result in the voltage across the capacitor 50 being equalized to the voltage at the tap of potentiometer 76. This is accomplished when transistors 86 and 88 are turned on which results in a current flow via one of the transistors—either to or from the capacitor 50 depending upon the previous voltage on the capacitor and the voltage at the tap of the potentiometer. Assume, for example, that as a result of a previous setting of a control unit, the voltage across the capacitor 50 is less than the voltage developed at the tap of the potentiometer 76 as a result of turning on the control unit 24. In this case, a diode 90 is reverse biased so as not to conduct current and a diode 92 is forward biased so that current flows from the tap of the potentiometer 76 via the transistor 88 and the diode 92 to the capacitor 50. The magnitude of this current is determined by the emitter-collector conductivity of transistor 88 which, in turn, is determined by the emitter-collector conductivity of transistor 84 which still, in turn, is determined by the resistance of the variable resistor 78. Thus, the rate at which the capacitor 50 is charged from the current flowing through the transistor 88 and diode 92 is determined by the setting of the variable resistor 78. Therefore, the rate at which the brightness level for the lamp load 8 is changed is determined by the setting of the variable resistor 78. Current continues to flow from the tap of the potentiometer 76 through the transistor 88 and the diode 92 to the capacitor 50 until the voltage across the capacitor 50 equals the voltage at the tap of the potentiometer 76. When this occurs, the brightness of the lamp load 8 has reached the level established by the setting of the tap of the potentiometer 76.

Now assume that the tap of the potentiometer 76 is set at a position which, when the control unit 24 is truned on, will have a voltage less than the voltage across the capacitor 50 subsisting from a previous setting. In this case, the diode 92 is reverse biased and thus does not conduct, whereas the diode 90 is forward biased resulting in the conduction of current from the capacitor 50 via the diode 90 and the transistor 86 to the potentiometer 76. Again, the magnitude of the current is determined by the collector-emitter conductivity of transistor 86 which, in turn, is determined by the emitter-collector conductivity of transistor 82. The setting of the variable resistor 78, of course, determines the emitter-collector conductivity of transistor 82 and thus the current flow from the capacitor 50 to the potentiometer 76. The voltage across the capacitor 50 is decreased by this current flow until it equals the voltage at the tap of the potentiometer 76.

The control unit 24 is turned off, i.e., disabled from affecting the voltage across the capacitor 50, by momentarily closing an "off" switch 56. Prior to closing the switch 56, when the control unit 24 is on so that the SCR 58 is conducting, the lefthand plate of the capacitor 62 is at a potential of B+ and the righthand plate is at near ground potential of conductor 32. When the switch 56 is closed, the potential of the lefthand plate of the capacitor 62 is brought to near ground potential causing the righthand plate to be momentarily brought to a negative potential below the potential of the lefthand plate. The voltage at the cathode of the SCR 58 is thus momentarily made higher than the voltage at the anode thereof thereby disabling or rendering the SCR 58 non-conductive. With the SCR 58 non-conductive, no current flows via the resistors 66 and 64 so that the transistor 74 is turned off. This, in turn, results in the turning off of transistors 82 and 84 so that the control unit 24 is disabled or turned off until the "on" switch 54 is again closed.

Note that the "off" switch 56 is connected via a conductor 94 to the other control units and specifically to the commutating capacitors of those units corresponding to the capacitor 62 of control unit 24. Thus, if one of the other control units were turned on and switch 56 were momentarily closed, the other control unit would be turned off or disabled in the same manner as described for control unit 24.

Momentarily closing the "on" switch of a control unit also causes disablement of all other control units in the same manner as described for closure of an "off" switch. However, unlike closure of an "off" switch, the closure of an "on" switch enables or turns on the control unit in which the "on" switch is located.

In the manner shown and described above, a plurality of control units can be connected to a lamp dimmer for controlling both the brightness of a lamp load and also the rate of change of brightness from one level to another level. Each of such control units is capable of changing the brightness level of the lamp load and of determining the rate of such change regardless of the previous setting or condition of any of the other control units. This may be done by setting the "brightness" and "rate" control knobs of the control unit, and then depressing the "on" pushbutton of the control unit. Of course, the "on" pushbutton could be depressed before setting the control knobs, with the "rate" control knob then being set, followed by the setting of the "brightness" knob. Subsequent changes in the brightness level could be effected in the same manner. To turn off all control units, the "off" pushbutton of any control unit is depressed.

It is to be understood that the above-described arrangement is only illustrative of the principles of the present invention. Other arrangements may be described by those skilled in the art without departing from the spirit and scope of the invention and it is intended that the appended claims cover such arrangements.

What is claimed is:

1. A light dimming system including:
    a dimmer circuit responsive to a voltage signal for controlling the flow of current through a lamp load; and
    at least one control unit coupled to said dimmer circuit, said control unit comprising:
    a potentiometer having a tap, the voltage at which determines the level of said voltage signal;
    a capacitor coupled to said dimmer circuit for storing an electrical charge to thereby develop thereacross a voltage substantially equal to said voltage level;

a first conducting means including a first transistor having an emitter and a collector connected in series between the tap of said potentiometer and said capacitor for conducting current from said tap to said capacitor when the voltage at the tap exceeds the voltage across said capacitor;
    a second conducting means including a second transistor having an emitter and a collector connected in series between said tap of said potentiometer and said capacitor for conducting current from said capacitor to said tap when the voltage across said capacitor exceeds the voltage at said tap;
    a variable impedance means; and
    means coupling said variable impedance means to the bases of said first and second transistors and responsive to the impedance of said variable impedance means for controlling the current flow through said first and second conducting means to control the rate of current flow between said tap and said capacitor.

2. A light dimming system as in claim 1 further including a power supply means for energizing said control unit and wherein said control unit comprises a switching device having a pair of power electrodes connected in series with said power supply means and having a control electrode, means responsive to the activation of said switching device for generating said voltage signal, and first manually operable switch means coupled to the control electrode of said switching device for activating said switching device.

3. A light dimming system as in claim 2 wherein said control unit further comprises a commutating capacitor, one side of which is coupled to one of the power electrodes of said switching device, impedance means coupled between the other side of said commutating capacitor and said power supply means, and second manually operable switch means coupled between the other side of said commutating capacitor and the other power electrode of said switching device for disabling said switching device.

4. A light dimming unit as set forth in claim 3 and including:
    a plurality of control units connected in parallel with one another to the dimmer circuit each for generating said control signal independently of the other control units; and
    each of said manually operable switch means is coupled to the switching devices of each of the other control units for disabling all such devices when said second manually operated switch means is operated and for disabling all such devices except the device in the unit operated when said first manually operated switch means in one of said units is operated.

5. A circuit for controlling the intensity and rate of change of intensity of a lamp load connected to an a.c. source through a dimmer unit of the type having a pair of d.c. control terminals, the magnitude of the voltage at which governs the intensity of the lamp load, which comprises:
    first and second terminals for connecting to a d.c. source;
    a controlled switching device;
    means for connecting said controlled switching device across said source-connecting terminals;
    means for connecting one control terminal of the dimmer unit to said second source-connecting terminal;
    means for triggering said controlled switching device;

an adjustable potentiometer;

means responsive to the triggering of said controlled switching device for impressing a voltage across said potentiometer;

first and second complementary transistors having their emitters connected to the tap on said potentiometer;

means for connecting the collectors of said first and second complementary transistors to the other control terminal of the dimmer unit to establish opposite current paths through said first and second complementary transistors between said tap of said potentiometer and said dimmer input to increase or decrease the control voltage level in accordance with the potential difference between the initial control voltage level of the dimmer unit and the tap of the potentiometer to equalize the voltage at said tap and said control terminals;

a variable resistance;

means connecting said variable resistance across said potentiometer; and means coupling said variable resistance to said first and second complementary transistors to control the conductivity of said first and second complementary transistors to vary the rate at which said control voltage level changes.

6. A circuit as set forth in claim 5 and including:

first manually operable switch means in series with said source terminals for energizing said triggering means to activate said controlled switching device;

means responsive to the activation of said switching device for generating said voltage signal;

a commutating capacitor connected between said first manually operable switch means and one side of said controlled switching device; and second manually operable switch means for connecting said commutating capacitor across said controlled switching device for disabling said switching device when said second manually operable switch means is operated--.

7. A circuit as set forth in claim 5 wherein the means for connecting the collectors of said first and second complementary transistors to the other control terminal of the dimmer unit includes first and second diodes arranged in opposite forward current carrying directions in the collector-emitter paths of said first and second transistors, respectively.

8. A circuit as set forth in claim 7 wherein said conductivity control means includes:

third and fourth complementary transistors complementing said first and second complementary transistors, respectively;

means connecting the collector-emitter junctions of said third and fourth complementary transistors in series with the bases of said first and second complementary transistors, respectively; and biasing means coupling said variable resistance to said third and fourth complementary transistors to control the conductivity of said third and fourth complementary transistors.

* * * * *